US011663778B2

(12) United States Patent
Hosfield et al.

(10) Patent No.: US 11,663,778 B2
(45) Date of Patent: May 30, 2023

(54) METHOD AND SYSTEM FOR GENERATING AN IMAGE OF A SUBJECT FROM A VIEWPOINT OF A VIRTUAL CAMERA FOR A HEAD-MOUNTABLE DISPLAY

(71) Applicant: Sony Interactive Entertainment Inc., Tokyo (JP)

(72) Inventors: Andrew Damian Hosfield, London (GB); Nicola Orrù, London (GB); Ian Henry Bickerstaff, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 278 days.

(21) Appl. No.: 16/816,560

(22) Filed: Mar. 12, 2020

(65) Prior Publication Data
US 2020/0302688 A1 Sep. 24, 2020

(30) Foreign Application Priority Data
Mar. 19, 2019 (GB) ...................................... 1903702

(51) Int. Cl.
*G06T 17/20* (2006.01)
*G06T 7/50* (2017.01)
(Continued)

(52) U.S. Cl.
CPC ............ *G06T 17/20* (2013.01); *A63F 13/211* (2014.09); *A63F 13/525* (2014.09); *G02B 27/01* (2013.01);
(Continued)

(58) Field of Classification Search
None
See application file for complete search history.

(56) References Cited

U.S. PATENT DOCUMENTS

2009/0309874 A1* 12/2009 Salganicoff ............ A61B 6/466
345/419
2012/0099804 A1 4/2012 Aguilera
(Continued)

FOREIGN PATENT DOCUMENTS

EP 2979736 A2 2/2016
EP 3712840 A1 9/2020
(Continued)

OTHER PUBLICATIONS

Extended European Search Report for corresponding EP Application No. 20151913.9, 14 pages, dated Jun. 26, 2020.
(Continued)

*Primary Examiner* — Kent W Chang
*Assistant Examiner* — Jonathan M Cofino
(74) *Attorney, Agent, or Firm* — Matthew B. Dernier, Esq.

(57) ABSTRACT

A method and system of generating an image of a subject from the viewpoint of a virtual camera includes obtaining a plurality of source images of a subject and pose data for each source camera or cameras that captured the source images. Virtual camera pose data is also obtained indicating a pose of a virtual camera relative to the subject. Each source image is distorted based on a difference in pose of the corresponding source camera and the pose of the virtual camera. A weighting is determined for each distorted image based on a similarity between the pose of the corresponding source camera and the pose of the virtual camera. The distorted images are then blended together in accordance with the weightings to form an image of the subject from the viewpoint of the virtual camera.

13 Claims, 11 Drawing Sheets

(51) Int. Cl.
| | |
|---|---|
| *G06T 15/04* | (2011.01) |
| *G06T 15/20* | (2011.01) |
| *A63F 13/211* | (2014.01) |
| *A63F 13/525* | (2014.01) |
| *H04N 13/332* | (2018.01) |
| *H04N 13/271* | (2018.01) |
| *H04N 13/349* | (2018.01) |
| *H04N 13/344* | (2018.01) |
| *G06F 3/01* | (2006.01) |
| *G02B 27/01* | (2006.01) |
| *A63F 13/213* | (2014.01) |
| *G06T 7/73* | (2017.01) |

(52) U.S. Cl.
CPC .......... *G02B 27/0172* (2013.01); *G06F 3/011* (2013.01); *G06T 7/50* (2017.01); *G06T 7/75* (2017.01); *G06T 15/04* (2013.01); *G06T 15/20* (2013.01); *H04N 13/271* (2018.05); *H04N 13/332* (2018.05); *H04N 13/349* (2018.05); *A63F 13/213* (2014.09); *A63F 2300/105* (2013.01); *A63F 2300/6661* (2013.01); *G02B 2027/014* (2013.01); *G06T 2207/10028* (2013.01); *G06T 2207/30244* (2013.01); *H04N 13/344* (2018.05)

(56) References Cited

U.S. PATENT DOCUMENTS

| | | | |
|---|---|---|---|
| 2012/0206442 A1 | 8/2012 | Tian | |
| 2013/0064465 A1* | 3/2013 | Tin | G06T 7/11 382/248 |
| 2013/0127993 A1 | 5/2013 | Wang | |
| 2013/0147785 A1* | 6/2013 | Patiejunas | G06T 15/04 345/419 |
| 2015/0352437 A1* | 12/2015 | Koseki | A63F 13/5255 463/31 |
| 2016/0165215 A1* | 6/2016 | Gu | G06V 10/40 348/43 |
| 2018/0158197 A1* | 6/2018 | Dasgupta | H04N 13/239 |
| 2018/0240272 A1* | 8/2018 | Doolittle | G06T 17/20 |
| 2019/0299097 A1* | 10/2019 | Hadjadj | A63F 13/52 |

FOREIGN PATENT DOCUMENTS

| | | |
|---|---|---|
| EP | 3712856 A1 | 9/2020 |
| GB | 2415344 A | 12/2005 |
| GB | 2582393 A | 9/2020 |
| WO | 2018164852 A1 | 9/2018 |
| WO | 2019063976 A1 | 4/2019 |

OTHER PUBLICATIONS

Lawrence Zitnick C et al., "High-quality video view interpolation using a layered Representation" ACM Transactions on Graphics, vol. 23. No. 3, pp. 600-608, Aug. 1, 2004.

Noah Snavely et al., "Photo Tourism: Exploring Photo Collections in 3D" ACM Transactions on Graphics, 12 pages, URL: http://search.proquest comjdocview/206 809510, 12 pages, Jul. 1, 2006.

Heiko Schwarz, et al., "Test Model under Consideration for HEVC based 3D video coding" International Organsation for Standardisation, URL:http://new.owieczka.netjwp-content/publication/2012/w12559.pdf, 44 pages, Feb. 29, 2012.

Anonymous: "Huge Geodesic Dome is World's 4 Largest 360-Degree Movie Set" Business Wire URL:https://www.businesswire.comjnews/home/20181218005178/en/Huge-Geodesic-Dome-World's-Largest-360-Degree-Movie 3 pages, Dec. 18, 2018.

Anonymous: "Tessellation (computer graphics)—Wikipedia" URL:https://en.wikipedia.orgjwjindex.php?title=Tessellation_(computer_graphics)&oldid=842764661, 3 pages, May 24, 2018.

Peter Rander: "A Multi-Camera Method for 3D Digitization of Dynamic. Real-World Events" The Robotics Institute, CMU-RI-TR-98-12, 136 pages, May 12, 1998.

Extended European Search Report for corresponding GB Application No. 1903702.7, 6 pages, dated Nov. 9, 2021.

Combined Search and Examination Report for corresponding GB Application No. 1903702.7, 2 pages, dated Aug. 9, 2019.

* cited by examiner

METHOD AND SYSTEM FOR GENERATING AN IMAGE OF A SUBJECT FROM A VIEWPOINT OF A VIRTUAL CAMERA FOR A HEAD-MOUNTABLE DISPLAY

BACKGROUND OF THE INVENTION

Technical Field

The present disclosure relates to Pa method and system for generating an image of a subject from the viewpoint of a virtual camera. The present disclosure further relates to generating such an image for display at a head-mountable display (HMD).

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent times, video content has become increasingly immersive. This has been due, in part, to the proliferation of HMDs, through which viewers are able to view such content. HMDs enable viewers to view content that has been superimposed over their world view, be that partially (in the case of augmented reality) or completely (in the case of virtual reality). In some cases, virtual content may be displayed to a viewer in a manner that respects the physical environment in which they're located (so-called mixed reality).

In some applications, a viewer may be presented with a 3D reconstruction of a real-life event. For example, the real-life event may correspond to a recording of a performer, e.g. playing a piece of music, presenting content, acting in a fictional series, etc. An example of such content is the 'Joshua Bell VR Experience' available on the PS4 (via PSVR).

One known technique for representing a performer in virtual reality comprises capturing a stereoscopic video of the performer and projecting this video as a texture onto a mesh within a 3D reconstruction of an environment. An example of such a technique is described in PCT/GB2018/052671. This technique tends to be sufficient where little head movement of the viewer is expected; however, for larger head movements, the limitations of the technique may become more apparent.

Another known technique for representing a performer in virtual reality (VR) involves arranging multiple cameras around the performer using e.g. a rig. The video captured by the cameras is used to create a complete geometric model of the performer, which can then be displayed appropriately to the viewer based on the viewer's orientation relative to the model. As will be appreciated, capturing VR content in this way is a time-consuming and expensive process. Moreover, the VR content resulting from such a capture process can often appear lifeless, with soft edges (such as hair) and complex surface materials not accurately being represented, if at all.

Light-field rendering is another technique that may be used for representing objects in 3D. However, light-field rendering tends to be computationally expensive and is often limited to representing static objects only.

Generally, there is a problem in the art with regards to rendering objects (static and/or dynamic) in 3D, without requiring an excessive amount of data or computational processing to do so. As will be appreciated, if this rendering is performed at a video games console, the computational power and resources available may be somewhat limited. Moreover, if the image is to be displayed at an HMD, any lag between movement of the viewer's head and rendering of the object from the new perspective may prove uncomfortable to the viewer. The present invention seeks to address or at least alleviate some of these problems.

SUMMARY OF THE INVENTION

It is to be understood that both the foregoing general description of the invention and the following detailed description are exemplary, but are not restrictive, of the invention.

According to a first aspect disclosed herein, there is provided a method of generating an image of a subject for display at a head-mountable display (HMD) in accordance with claim 1.

According to a second aspect disclosed herein, there is provided a system for generating an image of an object in accordance with claim 10.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
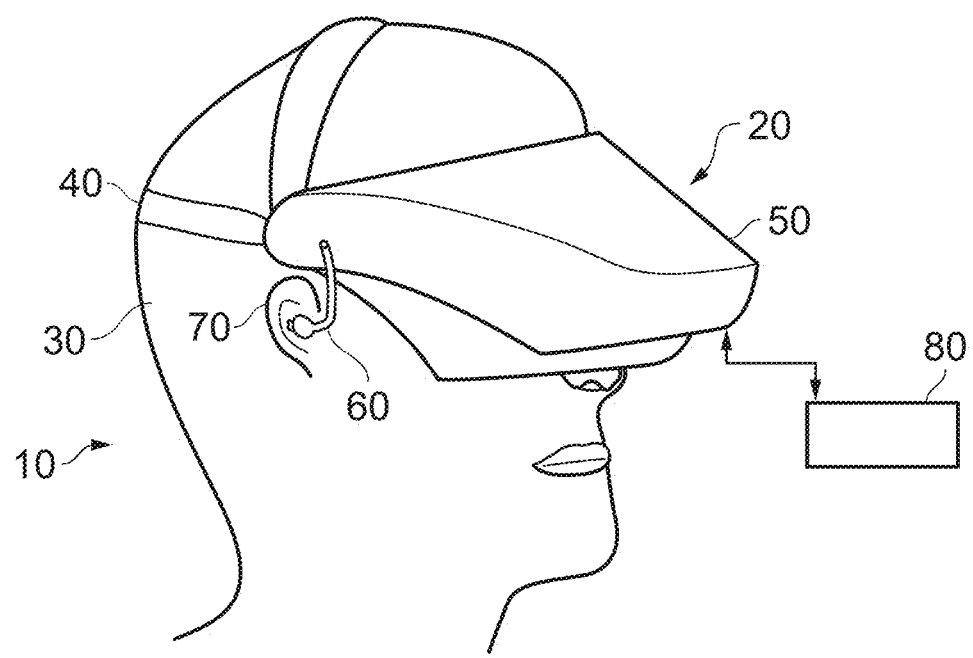
FIG. 1 shows schematically an example of a head-mountable display device.

Referring now to the drawings, wherein like reference numerals designate identical or corresponding parts throughout the several views, in FIG. 1 a user 10 is wearing an HMD 20 (as an example of a generic head-mountable apparatus). The HMD comprises a frame 40, in this example formed of a rear strap and a top strap, and a display portion 50.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera (not shown) may capture images to the front of the HMD, in use. A Bluetooth® antenna (not shown) may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

The HMD described in FIG. 1 may be used to display immersive video to a viewer. The term immersive video is used herein to refer to video content suitable for viewing in virtual, augmented and or mixed reality. Generally, the video will correspond, at least in part, to video of a real scene, including one or more real-world objects Immersive video may differ from game content in that images of the real-world objects have been used to represent those objects in 3D, to the viewer. However, immersive video may still allow a viewer to interact with objects represented in a virtual, augmented or mixed reality environment.

As mentioned previously, the immersive video may correspond to a video of a performance Examples of immersive video content include, for example, 'Joshua Bell VR Experience', 'Tom Grennan VR', etc. available on the PS4. For contextual purposes, the embodiments described herein will largely be described in relation to the display of immersive video content in VR.

As mentioned previously, there exist numerous techniques for generating immersive video content. These include, for example, capturing a scene as a volumetric video; capturing a stereoscopic video of a scene and projecting this onto a mesh within a 3D reconstruction of the scene; light-field rendering, etc. However, typically these techniques are time-consuming, expensive, and computationally intensive in terms of the resources required to render the video.

If a video games console is to be used to render immersive video, the computational power available may be somewhat limited. Moreover, any lag in the rendering of the video may cause the viewer to feel uncomfortable or even nauseous if the display of the video at an HMD is not updated in sync with the viewer's head movements. There is therefore a need in the art for a rendering process in which immersive video content can be generated, that suffers less from the set-backs associated with the above-described techniques.

Figure 2:
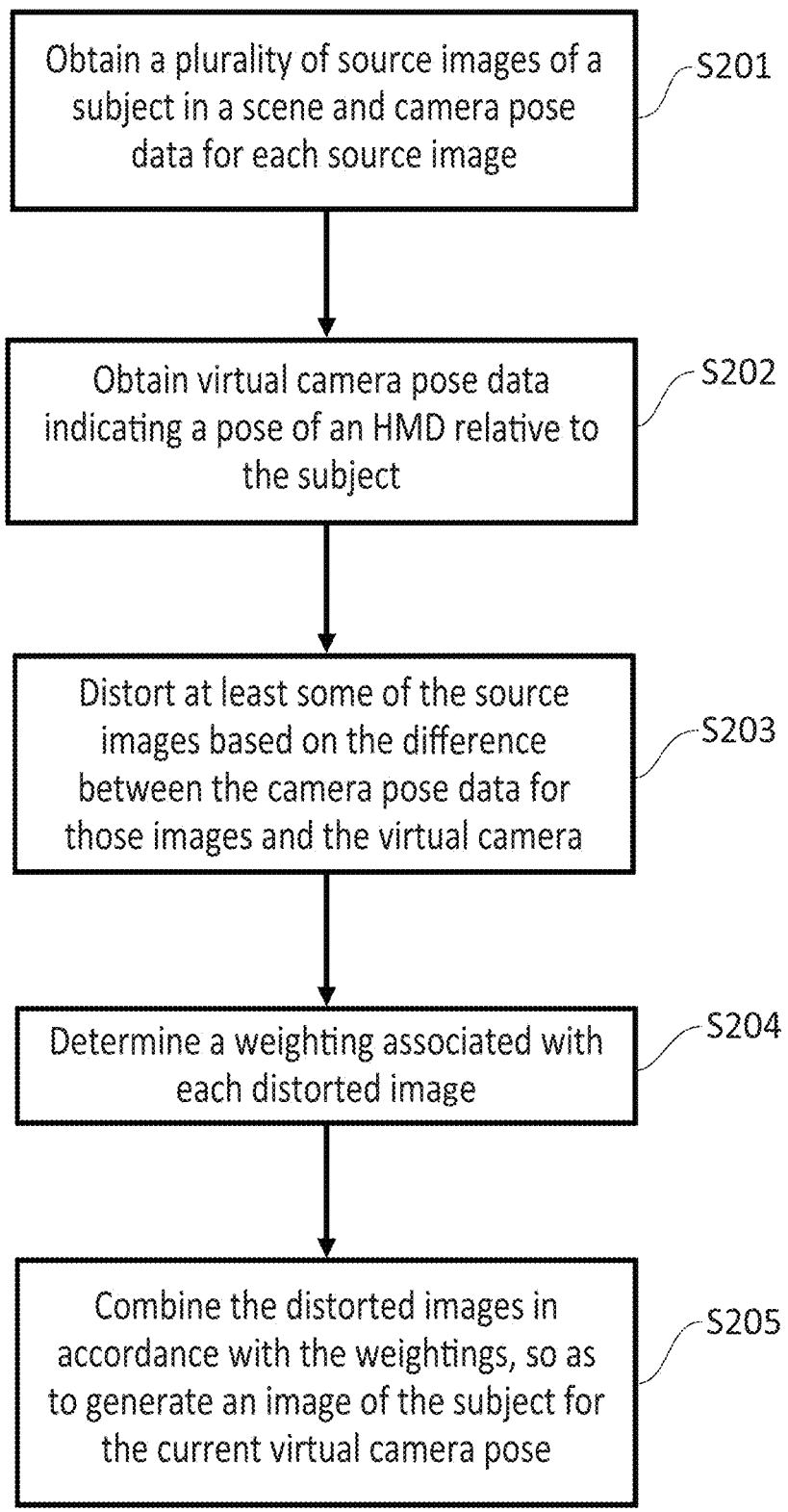
FIG. 2 shows an example of a method for reconstructing an image of an object from the viewpoint of a virtual camera.

A method for generating an image of a subject for display at an HMD in accordance with the present disclosure will now be described in relation to FIG. 2. Here, the 'subject' corresponds to a subject that is to be displayed as part of an immersive video.

At a first step S201, a plurality of source images of a subject in a scene are obtained. The subject may correspond to a static object or a dynamic object that is to be represented as part of an immersive video. Each source image is captured from a different respective viewpoint. That is, the pose of the camera relative to the subject for each source image is different relative to the pose of the camera for the other source images. As a result, each source image corresponds to a different view of the subject. The term pose is used herein to refer to the position and or orientation of the camera relative to the subject.

Each source image may correspond to a stereoscopic image captured by a stereoscopic camera. In some examples, multiple stereoscopic cameras may be used for capturing the stereoscopic images (e.g. one stereoscopic camera for each source image). That is, an array of stereoscopic cameras may be arranged around the subject, and the source images may correspond to the stereoscopic images captured by the stereoscopic cameras in the array. In additional or alternative examples, a single stereoscopic camera may be used, with the stereoscopic camera being moved to different positions around the subject, so as to obtain a plurality of source images of the subject from different respective viewpoints. The stereoscopic images may correspond to colour images, e.g. RGB or YUV images. In some examples, the source images may be compressed prior to the processing described herein.

In some examples, each stereoscopic camera comprises two image sensors with each image sensor having associated therewith one or more lenses for focussing light onto the corresponding sensor. The images captured by the image sensors may correspond to left- and right-images respectively. The left and right images may be displayed at left and right display elements of the HMD respectively (following processing, as will be described below).

In additional or alternative examples, at least some of the cameras may comprise monoscopic cameras (i.e. comprising one image sensor and one or more lenses for focussing light onto that sensor). These may be used in combination with an additional depth sensor, such as a time-of-flight, structured-light sensor, as will be described later.

In some examples, each source image may correspond to an image of the subject captured in front of a green screen. The parts of the source images corresponding to the green screen can be removed, allowing the subject to be isolated from its environment. The use of a green screen enables high-quality soft edges of the subject to be captured, which can then be represented in 3D.

Figure 3:
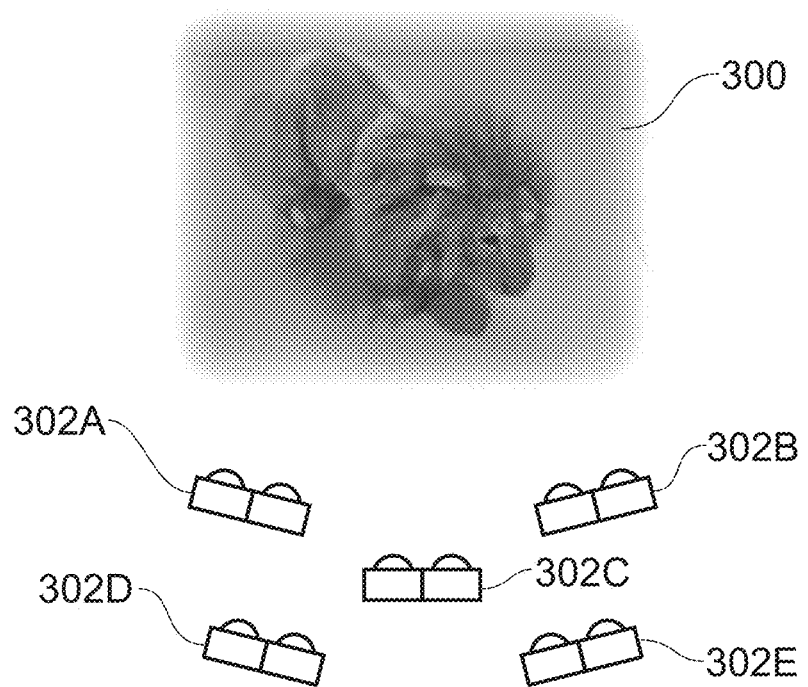
FIG. 3 shows an example of a subject and an arrangement of one or more cameras for capturing source images of the subject.

FIG. 3 shows an example of a subject and the positions of stereoscopic cameras for capturing source images of the subject. In FIG. 3, the subject corresponds to a stuffed lion toy 300 placed on and in front of a green screen. It will be appreciated that this is just an example of subject and that other subjects, such as performers, may also be captured in the same manner. In FIG. 3, the subject and cameras are shown in a top-down view.

In FIG. 3 it can be seen that the pose of the stereoscopic cameras relative to the subject corresponds to an array of stereoscopic cameras arranged in an x-formation. That is, a pair of stereoscopic cameras 302A, 302B are arranged to the left and right of the subject respectively; another stereoscopic camera 302C is located approximately centrally in front of the subject behind the first pair of stereoscopic cameras 302A, 302B; and a second pair of stereoscopic cameras 302D, 302E are located behind the centrally positioned stereoscopic camera, again to the left and right of the subject respectively. In some examples, this x-formation may be emulated by moving a single stereoscopic camera to each of the individual positions making up the x-formation.

In additional or alternative examples, the stereoscopic cameras may be arranged at different vertical heights. For example, the x-formation may also (or alternatively) correspond to the vertical arrangement of cameras. This means that, a first pair of stereoscopic cameras may be located above a lower pair of stereoscopic cameras, with a stereoscopic camera occupying a central position (vertically) between the two pairs of stereoscopic cameras. Such an arrangement of cameras may be said to coplanar in the x-y plane (with z corresponding to depth). An example of a stereoscopic camera array arranged in this manner will be described later, in relation to FIG. 10.

As will be appreciated, in other examples, the cameras need not be coplanar, with one or more of the cameras being offset in the z-direction. In some cases, a non-coplanar arrangement of cameras may improve the accuracy of the photogrammetry used to calculate the depth maps.

It will be appreciated that the relative separation of the stereoscopic cameras will determine the amount of source image data that is available for reconstructing the subject in 3D. Better coverage of the subject may be obtained by spacing the cameras further apart, such that occluded regions come in to view. The better the coverage, the more of the subject that can be represented in 3D, and therefore the greater the freedom of movement a viewer will have when viewing the reconstruction. However, if the cameras are spaced too far apart then this may result in less image data being shared between the source images, which in turn may create difficulties when attempting to blend source images together. Naturally, the accuracy with which the subject can be represented in 3D can be improved by capturing more images from different respective viewpoints. However, capturing more images will incur greater costs in terms of memory and processing power required to generate the 3D reconstruction—as is known to be high, for e.g. volumetric video. Hence the number of viewpoints may be an empirical trade-off between computational resource and quality of 3D reconstruction.

It has been found by the inventors that the x-arrangement shown in FIG. 3 is sufficient for immersive video purposes where movement of the viewer relative to the subject is expected to be relatively limited. This movement may be limited as a result of the nature in which the content is typically consumed, e.g. from a stationary position (such as sitting), or from the physical environment in which the content is being consumed (e.g. there may not be enough physical space for a viewer to attempt to walk behind a subject represented in VR). Thus, in immersive video, the subject may only need to be represented for a limited range of views. In addition, the source images captured via the arrangement shown in FIG. 3 will include overlapping regions, resulting in fewer 'holes' when the source images are combined together.

It will be appreciated that arranging stereoscopic cameras in an x-formation is just one example of the way in which stereoscopic cameras may be arranged relative to the subject. In other examples, alternative camera capture layouts may be used. Ultimately, the layout used and the number of images captured may depend on the subject being captured and the hardware that is to be used to process those images. More generally, the x-formation seen in FIG. 3 may the thought of as one example of a uniform distribution of viewpoints within a predetermined region of motion for the viewer.

Figure 4:
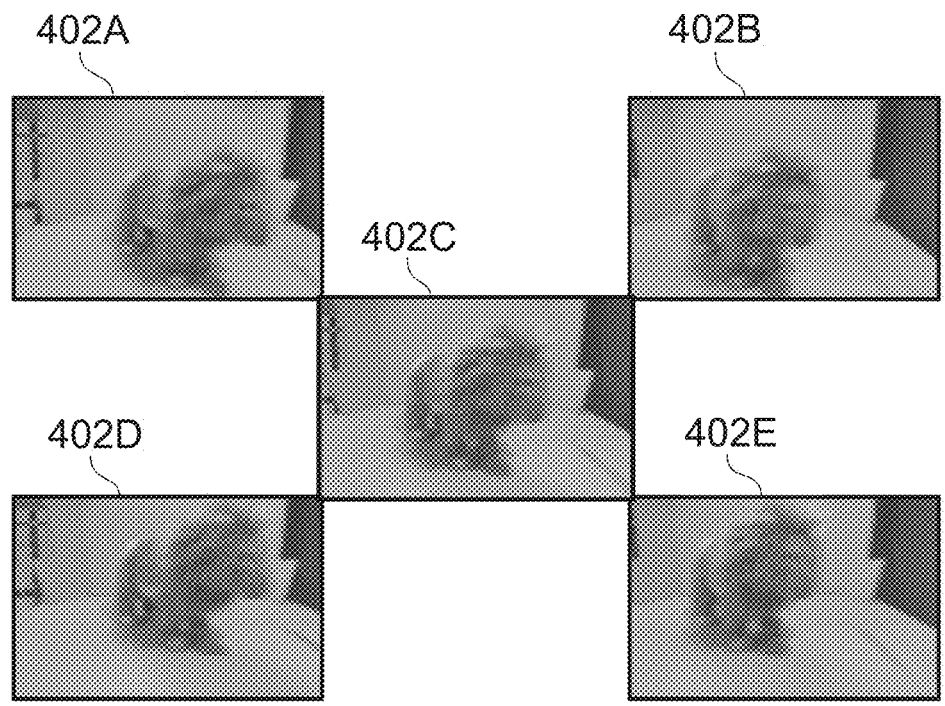
FIG. 4 shows an example of stereoscopic source images captured by a camera or cameras located at different positions relative to the subject.

FIG. 4 shows an example the stereoscopic images 402A, 402b, 402, 402D, 402E captured by each of the respective stereoscopic cameras. In FIG. 4, the positioning of the stereoscopic images corresponds to the positioning of the stereoscopic cameras relative to the subject. The stereoscopic images shown in FIG. 4 have been captured by a stereoscopic camera array arranged in the above-described x-formation.

Returning to FIG. 2, at step S201, camera pose data indicating a pose of a camera relative to the subject in the scene for each source image, is obtained. The camera pose data defines, for each source image, the position and or orientation of the camera relative to the subject. The camera pose data may be defined as metadata that is stored in association with the source images.

The camera pose data may be obtained during the capture of the source images. For example, the distance of the subject from the camera may be measured using e.g. a time-of-flight sensor, and changes in orientation of the camera tracked using e.g. an accelerometer or gyroscope associated with the camera. In some examples, it may be that the relative pose of the camera is not changed during the capture process (e.g. where an array of multiple cameras is used), and the pose of the camera relative to the subject may be determined using known photogrammetry techniques. For example, using a test subject, such as a chessboard, to determine the extrinsics of the camera.

At a second step, S202, virtual camera pose data indicating a pose of a virtual camera relative to the subject is obtained. The virtual camera data may correspond to the pose of an HMD at which a reconstruction of the subject is viewable. The pose of the HMD determines how the viewer is positioned and oriented relative to a reconstruction of the subject, and therefore corresponds to a virtual camera through which the subject is made viewable. It will be appreciated that the reconstruction of the subject need not actually be displayed at the HMD for the pose of the virtual camera pose relative to the subject to be determined. The pose of the virtual camera may be determined at render time.

The virtual camera pose data may be obtained from a pose detector incorporated into the HMD. For example, the HMD may comprise an accelerometer and or gyroscope for tracking changes in the pose of a viewer's head. Alternatively, or in addition, one or more external cameras may be used for tracking the pose of the viewer's head, e.g. via constellation tracking. The location of the subject within a reconstructed scene may be known, and the pose of the HMD used to determine a (virtual) pose of the viewer's head relative to the subject, in the reconstructed scene.

Returning to FIG. 2, at a third step S203, at least some of the source images are distorted. Each source image is distorted based on a difference between the pose of the camera that captured the source image and the pose of the virtual camera relative to a reconstruction of the subject. In other words, the degree of distortion for a given source image depends on how closely the view of the virtual camera corresponds to the view of the camera that captured the source image.

Generating the Distorted Images

Example methods for generating the distorted images will now be described in relation to FIGS. 4-11.

In some examples, generating the distorted images comprises obtaining depth data associated each source image. As mentioned previously, each source image may correspond to a stereoscopic image of the subject, and therefore depth data may be obtained for a given source image by performing stereo-matching on the left and right images making up the source image. The depth data obtained for a given source image may be used to generate a depth map (i.e. depth image) of the subject in that image. If the subject has been positioned in front of a green screen, then pixels in the source images corresponding to the background may be removed, prior to the generation of depth maps from those images. Alternatively, areas of the depth map exceeding a certain depth threshold may be rejected as a background region. Each depth map may correspond to a depth image captured from the same viewpoint as the camera that captured the corresponding source image. In some examples, the depth maps may be smoothed prior to the generation of a mesh from that depth map.

Figure 5:
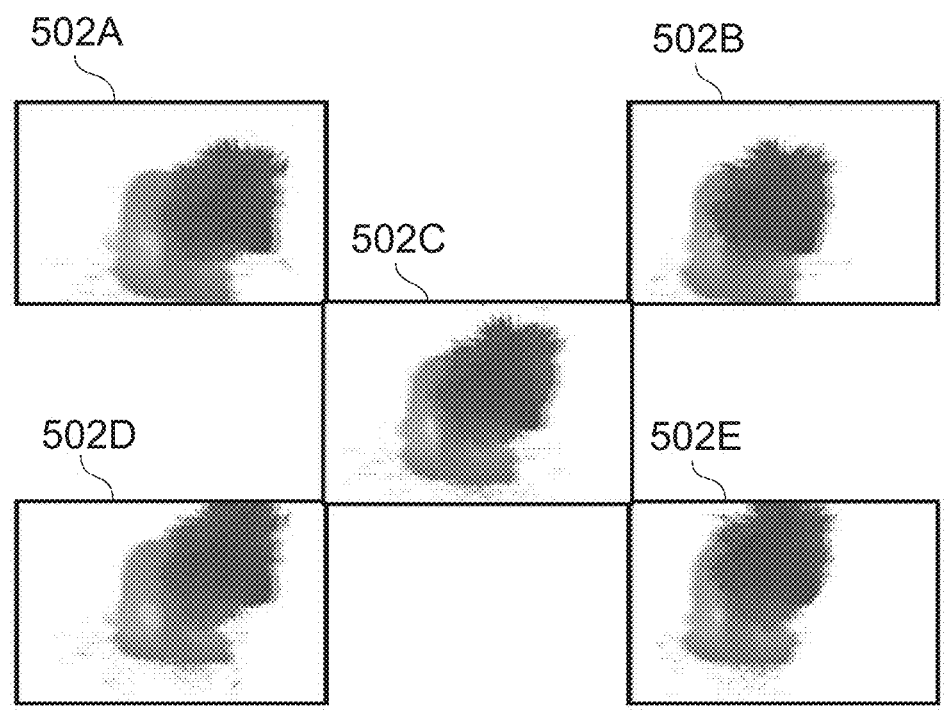
FIG. 5 shows an example of the depth maps generated for each corresponding stereoscopic source image.

FIG. 5 shows an example of the depth maps 502A, 502B, 502C, 502D, 502E generated for the stereoscopic images captured in accordance with FIGS. 3 and 4. In FIG. 5, each depth map is shown at a position corresponding to the position of the stereoscopic camera from which the stereoscopic image used to generate the depth map, was captured. In FIG. 5, there is a one-to-one correspondence between the depth maps and source images.

In alternative examples, depth data for each source image may be captured separately from the capture of the source images. For example, for each source image, a LIDAR scan of the subject may be performed from a corresponding viewpoint. In such examples, the source images need not be stereoscopic. Other known techniques for obtaining depth data for the corresponding view points may be used.

The source images may be defined in terms of RGB pixels and optionally an alpha value representing the transparency of each pixel. For each source image, a transparency mask may be generated using the regions in the image corresponding to the green screen and the corresponding depth map (i.e. large regions of uniform depth may be identified as belonging to a background region). The distance from the edge of the transparency mask may be stored in a signed distance field (SDF) to allow the edge of the transparency mask to easily be expanded or contracted as required. In examples where the source images comprise stereoscopic images, the transparency mask may be generated for the left and right images making up each stereoscopic image.

In some examples, the depth map of the subject may be expanded slightly to exceed the alpha outline and to fill in any holes (i.e. regions where depth data is missing). The depth map for a given source image may be stored as a plurality of mipmaps, with each successive mipmap corresponding a depth map of lower resolution. The mip-map level may be predetermined based on the image quality—i.e. the mip-map level may be a parameter that can be adjusted based on the how noisy the data is. The depth mip-maps may be generated by storing the closest (nearest to the camera) depth of the e.g. 4 pixels of the above mip-map layer.

Generating the distorted images may further comprise generating, for each source image, a polygonal mesh (e.g. triangular mesh) of the subject based on the source image and depth data obtained for that source image. Each polygonal mesh may be generated by applying a two-dimensional grid to the respective source image and determining, for that source image, a variation in depth across each unit of the two-dimensional grid. The tessellation density of the mesh may be determined based on the variation in depth across each unit of the two-dimensional grid applied to the corresponding source image. An example of this tessellation process is shown in FIGS. 6A and 6B.

Figure 6A:
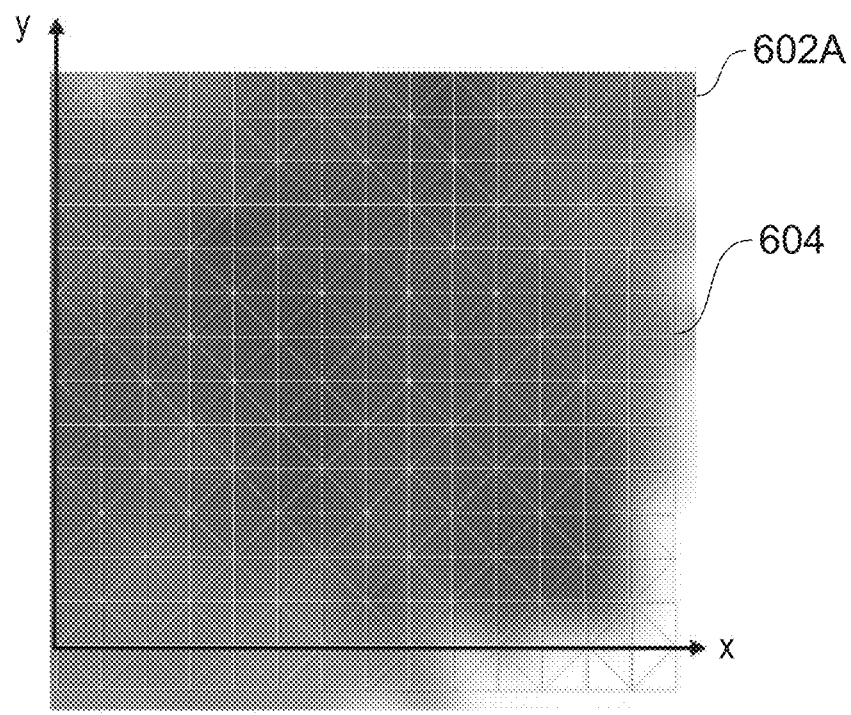
FIGS. 6A and 6B show an example of a tessellation process for generating a mesh for a given source image and corresponding depth map.
Figure 6B:
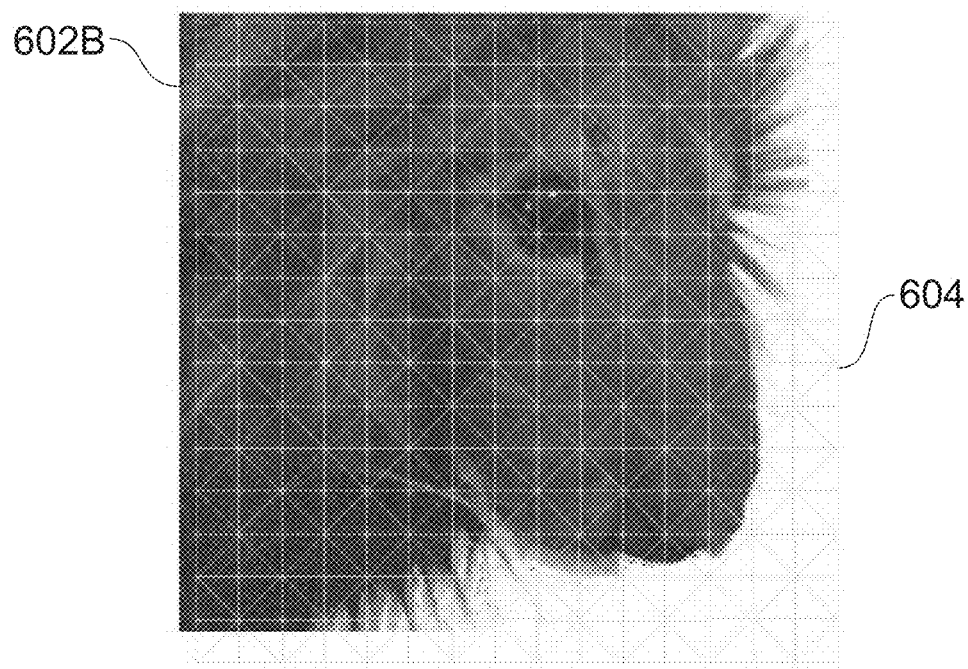

In FIG. 6A, a two-dimensional grid 604 having triangular tiles is shown as being aligned with the depth map 602A associated with a given source image. In FIG. 6B, the same grid 604 is shown as aligned with the corresponding source image 602B, which in this case, corresponds to one of the colour images making up a stereoscopic image. In FIGS. 6A and 6B the portion of source image and corresponding depth map align exactly. The x- and y-coordinates of the tiles are set to be equally spaced when viewed at a screen and the z-coordinates are determined by sampling the appropriate mipmap level of the corresponding depth map. The tessellation density is determined per triangular tile by the amount of the depth variation across the tile's vertices. This ensures that as much of the surface's shape is captured in the geometry as possible.

Following the generation of the polygonal meshes for the source images, at least some parts of the mesh may be trimmed. This trimming may be performed based on a determination that at least some portions of the mesh are outside of a threshold boundary corresponding to the outline of the subject.

Figure 7:
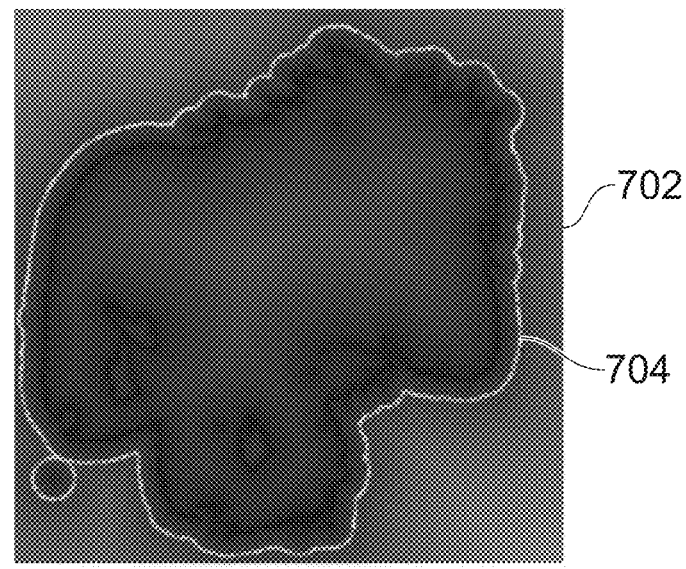
FIG. 7 shows an example of a trimming step in which parts of a generated mesh may be trimmed from the mesh.
Figure 7:
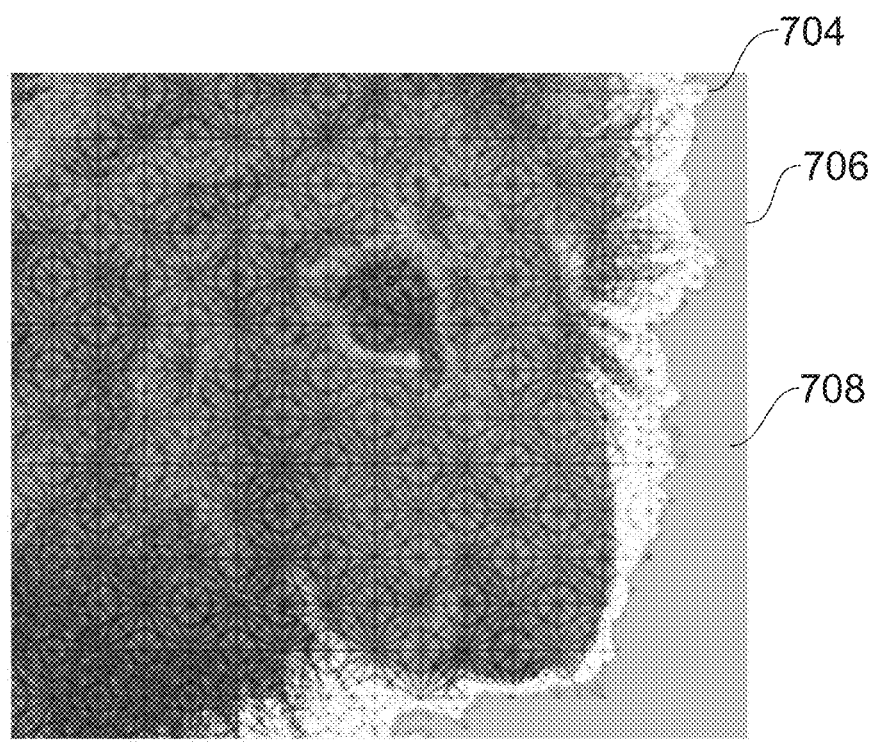

An example of this trimming is shown in FIG. 7, where the topmost image 702 corresponds to a signed-distance field representing the subject, with a threshold boundary 704 superimposed. The threshold boundary 704 may be defined based on the SDF, i.e. the boundary between the 'inside' and 'outside' of the shape of the subject defined by the SDF. In FIG. 7, the bottommost image 706 corresponds to the source image shown in FIG. 6 with a triangular mesh superimposed. Triangles may be removed from the mesh by defining a threshold distance from the boundary 704, above which triangles from the mesh are removed. In one example, it may be that any triangles lying more than 4 pixels outside of the boundary 704 are removed. In bottommost image 706, region 708 corresponds to the region for which any triangles of the mesh contained therein, are removed.

Figure 8B:
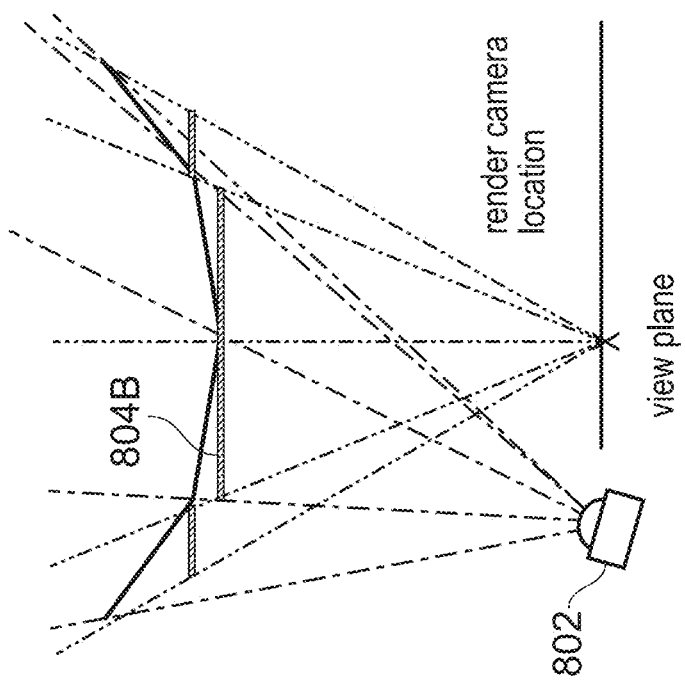
FIGS. 8A and 8B show schematically an example of portions of a mesh being re-projected based on a difference in pose between the corresponding source camera and the pose of a virtual camera.

Having generated a polygonal mesh for each source image, the distorted images may be generated by re-projecting at least some portions of the respective meshes to be perpendicular to the direction in which the virtual camera is facing. That is, for each source image, the distorted image may be generated by re-projecting at least some portions of the corresponding mesh to face the virtual camera. An example of this technique is shown in FIGS. 8A and 8B.

Figure 8A:
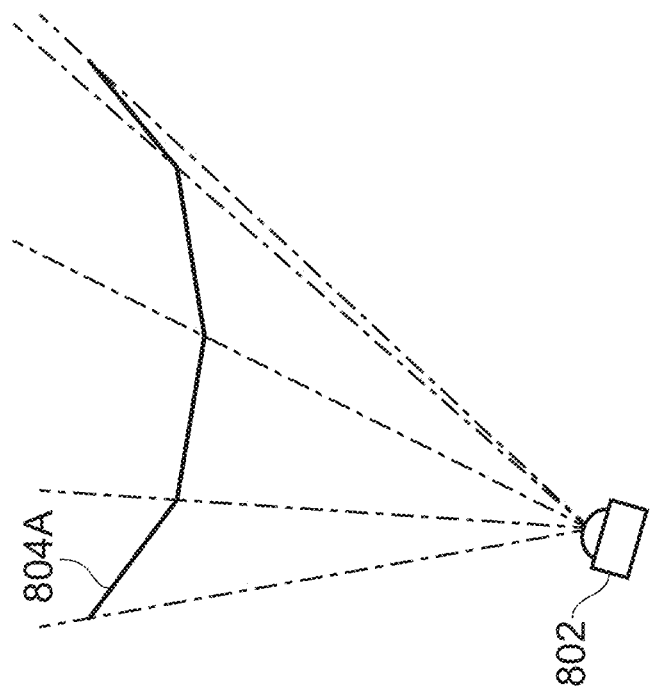

In FIG. 8A, a top-down view of a camera 802 and the tessellated surface of a mesh 804A representing the subject is shown. The position and orientation of the camera 802 relative to the subject corresponds to the position and orientation of the camera relative to the subject for one of the source images. In FIG. 8B, vertices of the mesh are shown as having been re-projected in accordance with the location of a virtual camera (shown at position 'x') corresponding to the render camera location. In FIG. 8B, the re-projected portions of the mesh are shown as re-projected portions 804B. As can be seen in FIG. 8B, the vertices of these portions have been re-projected so as to be parallel to the view plane (and perpendicular to the view direction of the virtual camera). This re-projection may involve, for example, re-aligning at least some of the triangles in the polygonal mesh such that, in screen space, the x and y values of the triangles are preserved but the z values are set to be the closest value to the viewpoint of the three vertices, or alternatively to a median or mean of the three vertices. This process of re-projecting portions of the mesh to face the virtual camera may be repeated for each mesh, based on the pose of the camera for each source image and the pose of the virtual camera.

Having re-projected at least some portions of each mesh, textures for applying to those meshes may be generated. That is, generating the distorted images from the source images may comprise, generating, for each re-projected mesh, a texture for applying to that mesh. The texture for a given mesh may be generated by parallax mapping the corresponding source image onto the mesh. A parallax shader may be used for performing this mapping. The parallax shader corrects for the change in perspective of the source image when mapping to the view of the virtual camera. Each distorted image (for a given source image) may correspond to a rendering of the corresponding re-projected mesh onto which the texture has been applied.

Figure 9:
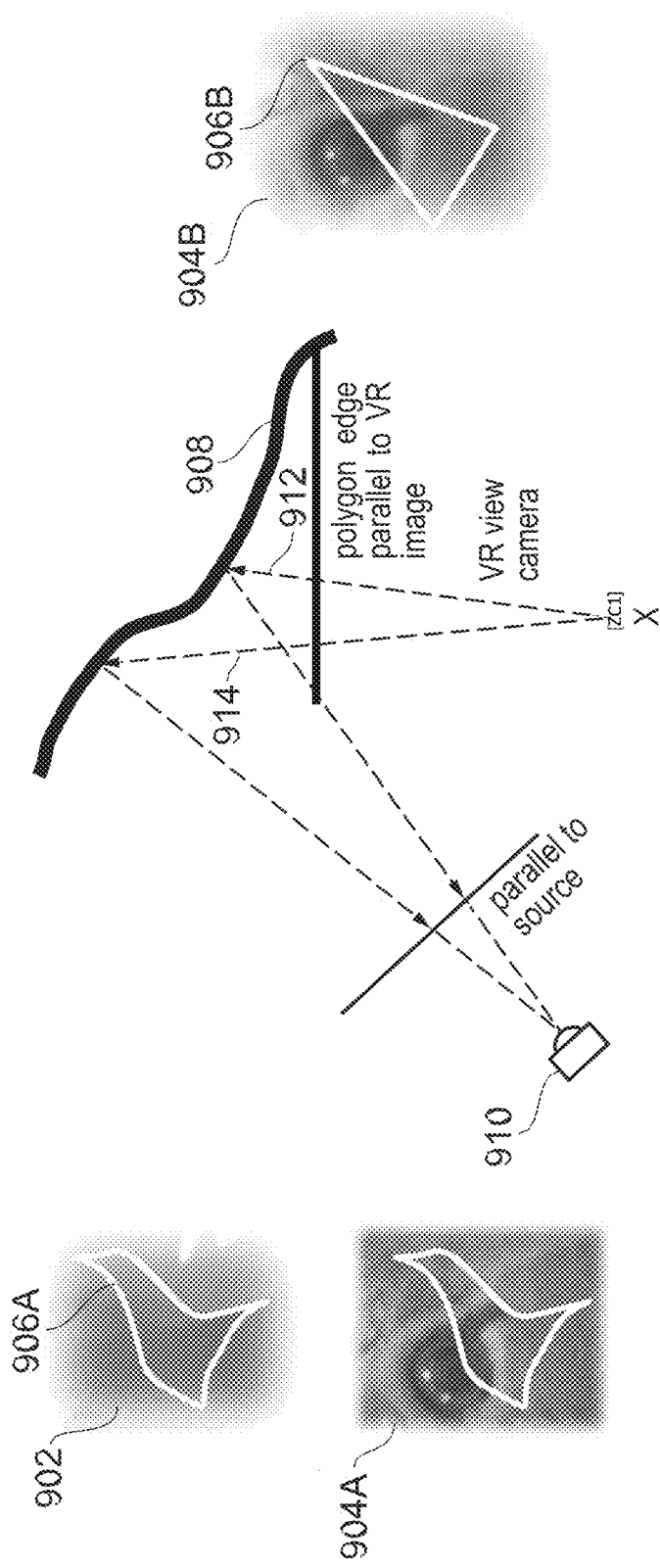
FIG. 9 shows an example of a parallax mapping technique for mapping regions of a source image to regions of the corresponding re-projected mesh.

FIG. 9 shows an example of a technique in which the colour information obtained from a source image may be applied as a texture to the corresponding mesh for which at least some portions have been re-projected (as described above). Here the mesh is 'corresponding' in the sense that it has been generated via the source image. That is, each mesh may be generated using a different source image.

On the left-hand side of FIG. 9, a portion of a depth map 902 and corresponding portion of a source image (undistorted) 904A is shown. Within this portion, a region 906A is shown, corresponding to a texture region for which parallax mapping is to be applied. The region 906 shown in FIG. 9 may correspond to a portion of the source image that is to be mapped onto a polygon (e.g. triangle) of the corresponding mesh. The same texture region 906B is shown on the right-hand side of FIG. 9 within a distorted portion of the source image 904B, following the parallax mapping.

In the middle region of FIG. 9, a surface of the subject 908 is shown relative to a source camera 910 for which the corresponding source image and depth map of the subject were obtained. The surface of the subject 908 shown in FIG. 9 is represented as a polygonal proxy-geometry surface that has been generated from the depth map.

The pose of the source camera corresponds to the pose of the camera for which the source image in question, was captured. In FIG. 9, the pose of the virtual camera (indicated at position 'x') is also shown relative to the subject. The pose of the virtual camera corresponds to the pose of a viewer relative to the subject.

In FIG. 9, a first ray 912 is shown starting from a polygon edge parallel to the VR image (corresponding to a re-projected polygon of the mesh) and is cast until it hits the surface edge of the depth map, using ray marching. The ray is then traced back to find its position on the source texture. This is repeated for multiple rays along the polygon edge parallel to the VR image (as indicated via second ray 914). From this, it can be determined how a given portion of the source image (i.e. source texture) is to be warped into the VR viewpoint's image space. Once the appropriate warping has been determined for a given portion of source texture, that portion of source texture can be applied to the corresponding polygon of the mesh.

Combining the Distorted Images

Returning to FIG. 2, at a fourth step, S204, a weighting is determined for each distorted source image. The weighting for a given source image is determined based on a similarity between the pose of the camera that captured the distorted image and the pose of the virtual camera (i.e. the degree of correspondence in views of the real and virtual camera). This means that, the greater the similarity between the pose of the source camera and the virtual camera, the greater contribution of that distorted image in the final blended image. In some examples, the weighting for a given distorted image may be determined based on the proximity of the corresponding source camera to the virtual camera and the subject.

Figure 10B:
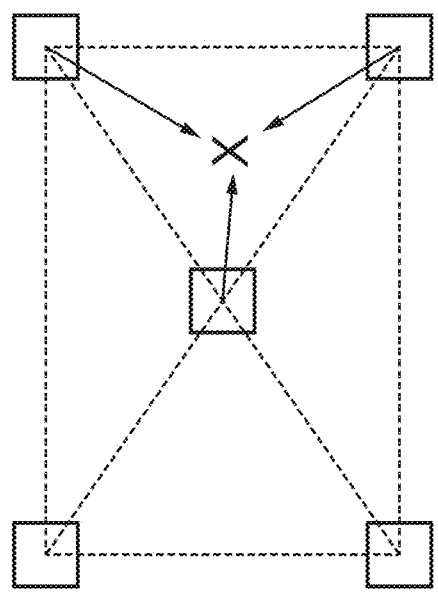
FIG. 10 shows schematically an example of a method for determining a weighting associated with each distorted image.
Figure 10A:
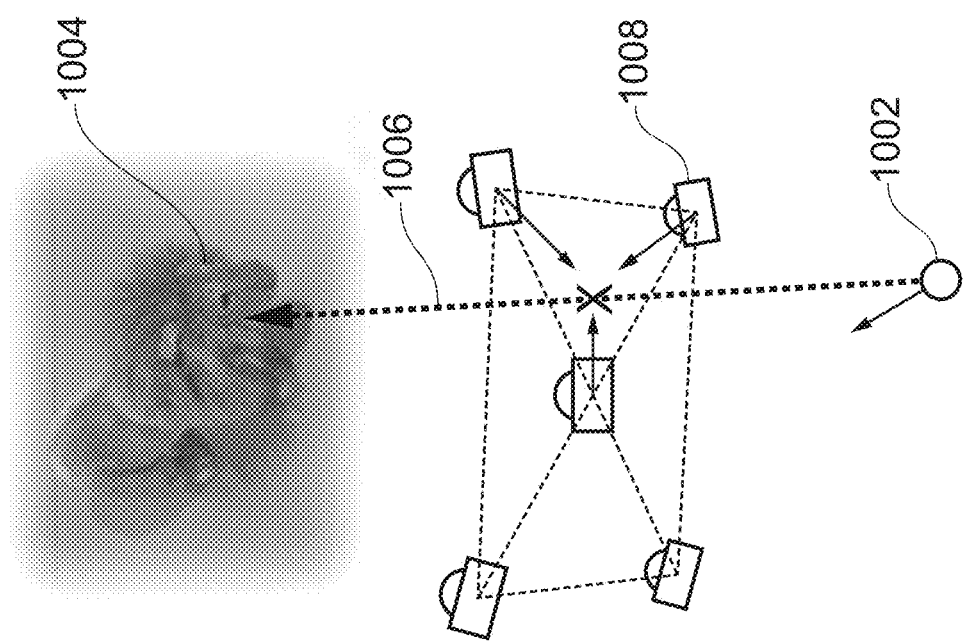

FIG. 10A shows an example of a method in which the weightings associated with the distorted images may be determined. In FIG. 10A, the virtual camera 1002 is shown at a given pose relative to the subject 1004. A line joining the virtual camera to the subject is indicated via dashed arrow 1006, which provides an indication of the distance of the subject in the z-direction. The poses of the source camera(s) relative to the subject are indicated at poses 1008. In FIGS. 10A and 10B, the source cameras are arranged in a co-planar arrangement.

FIG. 10A corresponds to a predominantly top-down view of the subject, source camera(s) and subject. FIG. 10B shows the same source cameras in transverse view. That is, in FIG. 10B, the relative horizontal and vertical positions of the source cameras are shown (but their relative distance from the subject is not).

The weighting associated with the distorted images may be determined by calculating an intersection between the line joining the virtual camera to the subject and a camera array plane. In FIGS. 10A and 10B, this point of intersection is marked as 'x' for the three rightmost cameras. The camera array plane may be defined as the plane joining at least three neighbouring cameras. For example, in FIGS. 10A and 10B, the x-y plane is shown as being partitioned into four slices centred on the central camera, with each slice corresponding to a camera array plane defined by a different subset of three cameras.

The weighting associated with a given distorted image may be determined based on the distance between the corresponding source camera and the point of intersection (marked 'x') in a given camera array plane. For example, for the three rightmost cameras, the weighting associated with each camera may be larger, the smaller the distance between the point marked 'x' and the position of that camera. It will be appreciated that optionally contributions from increasingly distant cameras may also be used.

In some examples, determining the weightings associated with each distorted image may include determining the signed barycentric coordinates of the intersection between a ray from the observer and the subject, and each of the triangles making up the camera array plane. In a typical, non-degenerate use case, for one of the triangles, two or three of the barycentric coordinates will be positive and can be used as the weightings for the matching views.

Generally, the weighting for a given distorted image may be determined based on the proximity of the corresponding source camera to the virtual camera and the subject. In the example shown in FIG. 10A, it may be for example, that a lower weighting is assigned to source images captured by the top left camera compared with source images captured by the top right camera. This is because the view of the top left camera corresponds less with the view of the virtual camera.

In some examples, the directions in which each source camera is pointing may be known, and this information may be compared with a vector joining the virtual camera to the subject, to determine how closely each source camera is aligned with the virtual camera. The position of the source cameras and virtual camera may also be used to determine how closely the source cameras are aligned with the virtual camera. Again, the closer a given source camera is aligned with the virtual camera, the larger the weighting assigned to distorted images that have been generated via that source camera.

It will be appreciated that while the cameras shown in FIG. 10B are in a co-planar arrangement, other arrangements may be used and that there may be different (and indeed multiple) camera array planes for which intersections are determined for the cameras defining that plane or sub-plane, so as to determine a weighting associated with the distorted images obtained from those cameras.

The techniques described above may be extended to any arrangement of cameras where there is a central camera and N distal cameras arranged around the central one, symmetrically or asymmetrically. For example, there may be as many as N camera array planes (where N+1 equals the total number of cameras, the '1' coming from the central camera), and point of intersection between a ray joining the virtual camera and the subject with one or more of these planes may be determined. This point of intersection may then be used to determine the weightings associated with images obtained from each camera, using any of the techniques described above.

More generally, any arrangement of cameras may be used, with the origins of those cameras projected onto the x-y plane being used to determine a triangulated irregular network coverage of the plane. Then weighted contributions from at least the three cameras forming the triangle comprising the point of intersection 'x' with the virtual camera may be used to generate the final blended image.

Returning to FIG. 2, at a fifth step S205, the distorted images are combined in accordance with the determined weightings so as to generate an image of the subject from the viewpoint of the virtual camera. The generated image may correspond to a stereoscopic image that is to be output for display at an HMD. Optionally, fully transparent pixels of each distorted image may be discarded prior to the blending of the distorted images.

In some examples, a set of distorted images may be generated for each set of the left and right images captured by the stereoscopic cameras. The distorted images generated for the left images may be blended together to form the image for display at the left-eye display element of the HMD. Similarly, the distorted images generated for the right images may be blended together to form the image for display at the right-eye display element of the HMD.

Figure 11:
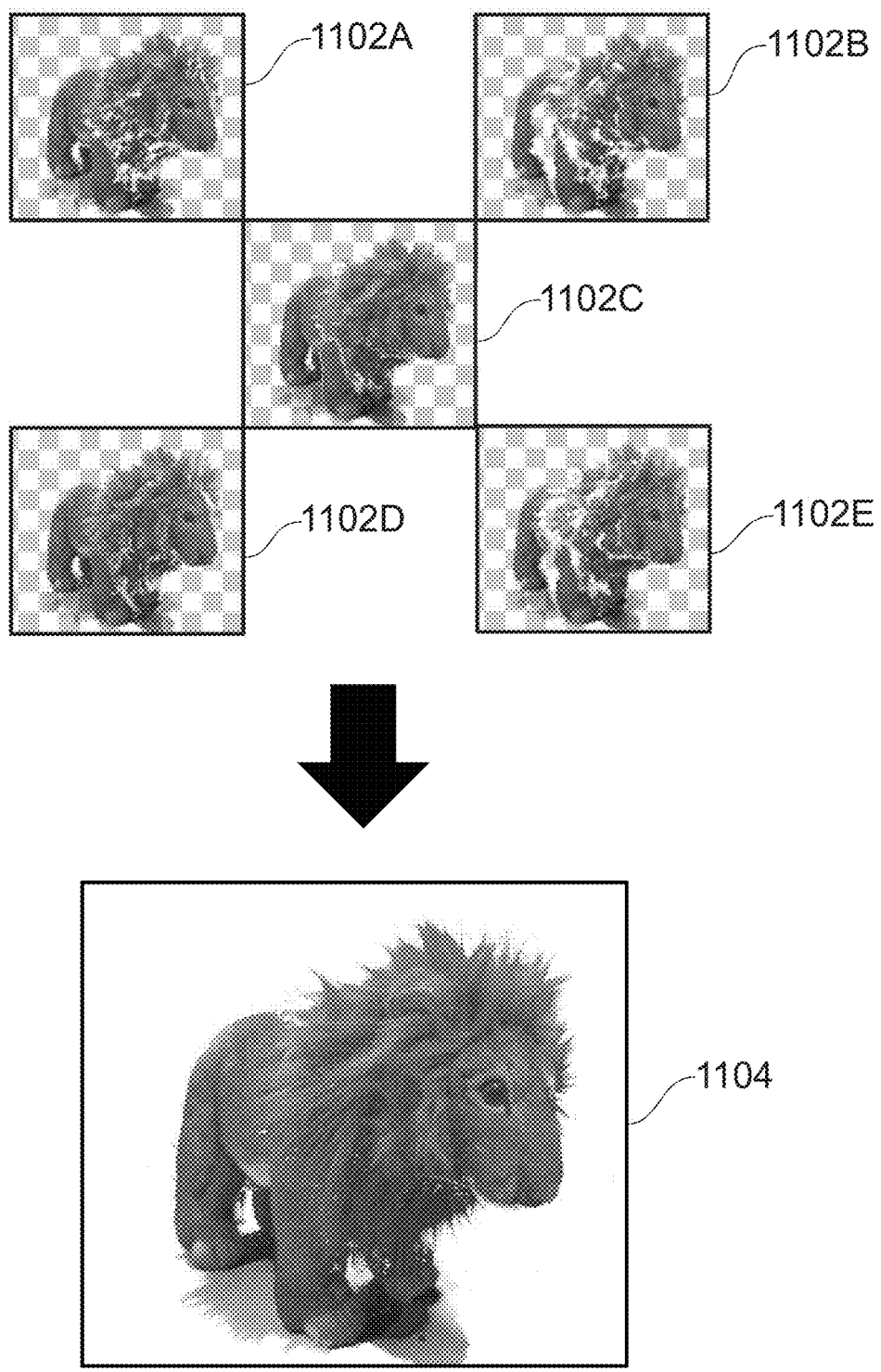
FIG. 11 shows an example of distorted images generated in accordance with the present disclosure and the final image that is obtained by blending these images together.

FIG. 11 shows an example of the distorted images 1102A, 1102B, 1102C, 1102D, 1102E, generated in accordance with the above-described method. The relative arrangement of the distorted images in FIG. 11 corresponds to the relative arrangement of the stereoscopic camera (or cameras) that captured the corresponding source images. In FIG. 11, all of the distorted images correspond to a set of distorted images generated from the left (or right) images of the stereoscopic images described previously.

As can be seen in FIG. 11, there are varying levels of holes (i.e. missing colour data) in the distorted images. The level of holes associated with a given distorted image generally depends on how closely the associated source image corresponds to the viewpoint of the virtual camera for which the subject is to be represented. In FIG. 11, the viewpoint of the virtual camera corresponds to being oriented to left of the subject and so the distorted images obtained from source cameras in corresponding positions (e.g. images 1102A, 1102C, 1102D) have fewer holes. In any case, once the distorted images have been combined, there will be fewer holes in the composite image.

An example of an image that has been generated by blending the distorted images together, in accordance with the determined weightings, is shown as final image 1104 in FIG. 11. As can be seen in FIG. 11, there is still some gaps in the final image 1104, corresponding to regions of the subject that none of the distorted images were able to fill. These regions can be filled using simple threshold-based filters, for example. The final image that is actually displayed may therefore correspond to the blended distorted images for which at least some hole-filling has been performed.

In some examples, it may be that texture space is limited and only one image from the stereo pair (for each stereopair)

is used in the final blending. When these images are reprojected, the quality of the final image will generally be sufficient, particularly if this compromise is just used for the outer cameras (e.g. all left or all right cameras). This may be appropriate, where for example, the final image is not to be displayed as a stereoscopic image, but rather as a single image. Alternatively or in addition, it may be that a stereoscopic image is subsequently generated from the single image that has been generated in this way.

It has been found by the inventors that specular highlights and reflections are often still represented correctly when only one set of images from the stereoscopic images is used in generating the final image. This is because the depth of the reflection is stored in the depth map rather than the reflective surface. However, the results will generally be improved when both images in each stereoscopic pair are used for generating the final image.

Once the final image of the subject has been generated, this may be displayed as part of an immersive video. The environment in which the subject is displayed may be generated separately from the subject itself. For example, the subject may be super-imposed in front of a computer-generated environment. In some cases, it may be that e.g. a LIDAR scan of an environment, such as a studio or a set is performed, and that this is used to generate a reconstruction of that environment. This may be appropriate where, for example, the immersive video corresponds to a live performance or a game taking place in a real environment. The subject may then be appropriately positioned within this re-constructed environment, with the representation of the subject being adjusted in accordance with the above-described methods.

While the above described embodiments have been described in relation to generating images for display at an HMD, it will be appreciated that the same techniques may equally be used to render objects in 3D for display at any type of display screen.

A computer readable medium having computer executable instructions adapted to a cause a computer system to perform the previously described methods may also be provided. In some examples, the rendering method may be performed at e.g. a games console, and the final image displayed at the display of an HMD that is in communication with the games console. Alternatively or in addition, at least some of the rendering may be performed at e.g. a server, and the final image may be provided to the display of an HMD that is in communication with the server via e.g. an internet connection or via a games console that is in communication with the server. Alternatively or in addition, the HMD may perform at least part of the rendering method itself, if it comprises suitable processing means.

In some examples, it may be that the rendering is shared amongst two or more of the server, the games console, or the HMD, with the final image being relayed if necessary from the games console to the HMD. Ultimately, any combination of server, games console and HMD may be used to perform the rendering, depending on the respective hardware capabilities and the nature of the subject that is being rendered.

Figure 12:
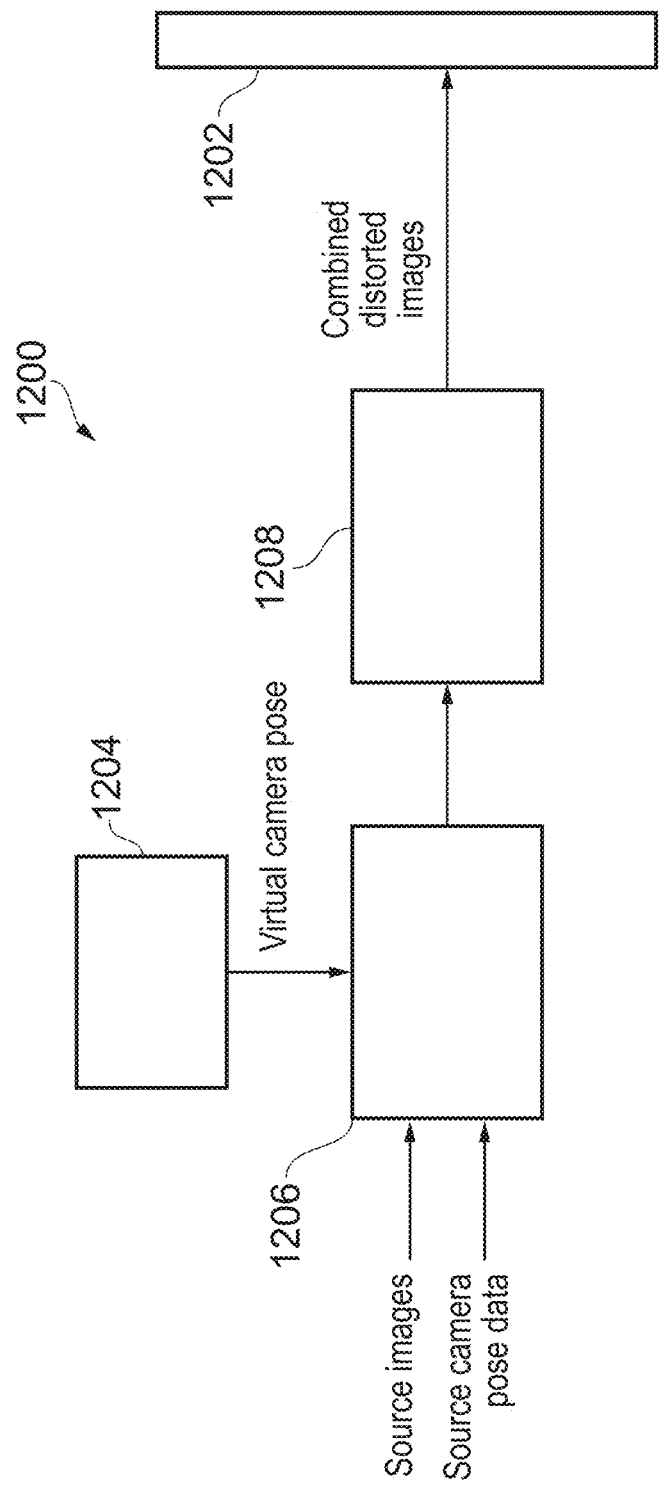
FIG. 12 shows an example of a system for generating images of an object from the perspective of a virtual camera.

A display system for implementing the above-described method will now be described in relation to FIG. 12.

The display system 1200 comprises a display element 1202 operable to display an image of an object to a viewer. The object may be a static (e.g. stuffed toy) or dynamic (e.g. performer) object. The object corresponds to the subject described previously. The display element may correspond to the display of an HMD, as described previously in relation to FIG. 1.

The system further comprises a pose detector 1204 operable to detect a pose of a viewer's head. The pose detector 1204 may comprise e.g. an accelerometer and or gyroscope that is incorporated into an HMD. Alternatively or in addition, the pose detector 1204 may comprise one or more cameras, and the pose of the viewer's head may be detected based on the pose of the viewer's head in the images captured by the one or more cameras. In some examples, the HMD have a plurality of light sources attached thereto, and the pose of the viewer's head may be determined based on how these light sources appear in images captured by the camera(s) (e.g. using constellation tracking).

As described previously, the pose of a viewer's head may correspond to the pose of a virtual camera that is to be used for viewing an object from different respective viewpoints. The pose detector 1204 thus enables the pose of the virtual camera to be determined. It is generally expected that, when the viewer is viewing an immersive video, the pose of the virtual camera (and viewer's head) will be different from the poses of the source cameras for which source images of the object have been captured.

The system further comprises an image processor 1206 operable to obtain a plurality of source images of the object and camera pose data indicating a pose of a camera that captured each source image. As described previously, each source image may be captured by an array of plural cameras (e.g. stereoscopic cameras) or by moving a single camera to different positions relative to the object. Each source image is associated with a corresponding source camera, for which the camera pose data corresponds. The source images may have been captured in any of the manners described previously in relation to FIGS. 3-11.

The image processor 1206 is configured to receive an input from the pose detector 1204, and in response thereto, distort at least some of the source images based on a difference between the pose of the camera or cameras associated with the source images and a current pose of the viewer's head relative to the object. The pose of the viewer's head relative to the object corresponds to the pose of a virtual camera relative to a reconstruction of the object.

Specifically, the image processor 1206 is configured to distort each source image based on the difference in pose of the source camera associated with that image and the pose of a virtual camera through which the object is viewable. The distortion of the source images may be performed in accordance with any of the methods described above in relation to FIGS. 3-11.

The system further comprises an image combiner 1208 configured to determine a weighting associated with each distorted image based on a similarity between the pose of the camera associated with that image and the pose of the viewer's head relative to the object (or a reconstruction thereof). The image combiner 1208 is further configured to combine the distorted images together in accordance with the associated weightings to form an image of the subject for display at the display element. That is, the image combiner 1208 may be configured to blend the distorted images together, to generate a final image of the object from the viewpoint of the viewer (which in turn, corresponds to the viewpoint of a virtual camera through which the object is made viewable). The final, blended image may correspond may be superimposed with a real or virtual environment that is viewable to the viewer.

In some examples, the image processor 1206 is further configured to obtain depth data associated with each source image, and to generate, for each source image, a polygonal mesh of the subject based on the source image and depth data associated with that image. The depth data may be obtained in any of the manners described previously. The image processor 1206 is configured to generate a distorted image from each source image by reprojecting at least some portions of the mesh generated for that source image so as to be perpendicular to the direction in which the viewer's head is facing (corresponding to a gaze direction of the viewer). This re-projection of the mesh has been described previously in relation to FIGS. 8A and 8B.

The image processor 1206 may be configured to generate, for each re-projected mesh, texture for applying to that mesh. The image processor 1206 may comprise a parallax shader operable to parallax map portions of the source image to corresponding portions of the re-projected mesh that has been generated from that source image. This parallax mapping process is illustrated in FIG. 9, as described previously.

The pose of the viewer's head corresponds to the pose of a virtual camera for viewing the object and the poses of the camera or cameras that captured the source images corresponds to a camera array plane. The image combiner 1208 may be configured to determine a weighting for each distorted image by determining a point of intersection between a vector joining the virtual camera to the object and the camera array plane. The image combiner 1208 may be configured to determine a weighting for each distorted image based on the distance of the camera associated with that image and the point of intersection on the camera array plane. This process is illustrated in FIGS. 10A and 10B, described previously.

In some examples, the image processor 1206 may be implemented at a video games console that is in communication with a head-mountable display (HMD) comprising the display element 1202. The video games console may thus be configured to generate and blend the distorted images and to transmit the result to the HMD for display thereat. In some examples, it may be that the distorted images are generated at the e.g. games console and the combining is performed at the HMD. A next generation console, such as e.g. the PS5™ may be suitable for distorting each of the source images in accordance with the above described methods.

Alternatively or in addition it may be that the image processor 1206 is implemented at the HMD itself, in a similar manner to the video games console as described above.

Alternatively or in addition, it may be that the image processor 1206 is implemented at e.g. a server that the video games console and or HMD is in communication with. The distorted images may thus generated at, and transmitted from, the server to the HMD (possibly via the games console). As will be appreciated, the viewer may make several small movements of their head and so it may be preferable for the distorted images to be generated at the games console and not the server. This will limit any lag introduced by having to transmit the head pose data to the server, before the object can be rendered from the corresponding viewpoint.

It will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating an image of a subject from the viewpoint of a virtual camera, the method comprising:
    obtaining a plurality of source images of a subject in a scene, each source image being captured from a different respective viewpoint;
    obtaining camera pose data indicating a pose of a camera relative to the subject for each source image;
    obtaining virtual camera pose data indicating a pose of a virtual camera relative to the subject;
    generating, for at least some of the source images, respective distorted images, each distorted image being generated based on a difference between the pose of the camera that captured the source image and the pose of the virtual camera; and
    determining a weighting associated with some of the distorted images based on a similarity between the pose of the camera that captured the distorted image and the pose of the virtual camera, and combining the distorted images in accordance with the determined weightings so as to generate an image of the subject from the viewpoint of the virtual camera, wherein:
    each source image comprises a stereoscopic image captured by a respective stereoscopic camera among an array of stereoscopic cameras arranged vertically and or horizontally in an x-formation to define a plane relative to the subject,
    at least five source images are obtained, the poses associated with the at least five source images corresponding to the array of stereoscopic cameras, and
    determining a weighting associated with the some of the distorted images comprises, which are generated from among the at least five source images:
    (i) determining a point of intersection between a line joining the virtual camera to the subject and a triangle defined in the plane by a subset consisting of three neighbouring stereoscopic cameras of the array of stereoscopic cameras; and
    (ii) determining a weighting associated with each distorted image, among the respective distorted images, taken from the subset consisting of the three neighbouring stereoscopic cameras based on a distance between each such neighbouring stereoscopic camera of the subset and the point of intersection, and combining the respective distorted images for each of the three neighbouring stereoscopic cameras of the subset in accordance with the determined weightings.

2. A method according to claim 1, wherein generating the distorted images comprises:
  obtaining depth data associated with each source image;
  generating, for each source image, a polygonal mesh of the subject based on the source image and depth data associated with that image; and
  reprojecting, for each mesh, at least some portions of the mesh to be perpendicular to the direction in which the virtual camera is facing.

3. A method according to claim 2, wherein generating the distorted images further comprises:
  generating, for each re-projected mesh, a texture for applying to that mesh, the texture being generated by parallax mapping the corresponding source image onto the mesh; and
  wherein generating the distorted images comprises rendering a 2D image of the respective re-projected meshes onto which the texture has been applied.

4. A method according to claim 2, wherein generating the polygonal meshes comprises:
  applying a two-dimensional grid to each source image;
  determining, for each source image and the obtained depth data for that image, a variation in depth across each unit of the two-dimensional grid; and
  generating, for each source image, a corresponding polygonal mesh, wherein the tessellation density of the mesh is determined based on the variation in depth across each unit of the two-dimensional grid applied to the source image.

5. A method according to claim 1, wherein each source image corresponds to an image of the subject captured in front of a green screen; and
  wherein generating the distorted images further comprises:
    separating, for each source image, pixels corresponding to the subject from pixels corresponding to a background.

6. A method according to claim 1, wherein the virtual camera pose data corresponds to the pose of an HMD that is being used to view a reconstruction of the subject; and
  wherein generating the image of the subject comprises generating a stereoscopic image and outputting the generated stereoscopic image at the HMD.

7. A non-transitory, computer readable storage medium having computer executable instructions stored thereon, which when executed by a computer system, cause the computer system to generate an image of a subject from the viewpoint of a virtual camera by carrying out actions, comprising:
  obtaining a plurality of source images of a subject in a scene, each source image being captured from a different respective viewpoint;
  obtaining camera pose data indicating a pose of a camera relative to the subject for each source image;
  obtaining virtual camera pose data indicating a pose of a virtual camera relative to the subject;
  generating, for at least some of the source images, respective distorted images, each distorted image being generated based on a difference between the pose of the camera that captured the source image and the pose of the virtual camera;
  determining a weighting associated with some of the distorted images based on a similarity between the pose of the camera that captured the distorted image and the pose of the virtual camera, and combining the distorted images in accordance with the determined weightings so as to generate an image of the subject from the viewpoint of the virtual camera, wherein:
  each source image comprises a stereoscopic image captured by a respective stereoscopic camera among an array of stereoscopic cameras arranged vertically and or horizontally in an x-formation to define a plane relative to the subject,
  at least five source images are obtained, the poses associated with the at least five source images corresponding to the array of stereoscopic cameras, and
  determining a weighting associated with the some of the distorted images comprises, which are generated from among the at least five source images:
  (i) determining a point of intersection between a line joining the virtual camera to the subject and a triangle defined in the plane by a subset consisting of three neighbouring stereoscopic cameras of the array of stereoscopic cameras; and
  (ii) determining a weighting associated with each distorted image, among the respective distorted images, taken from the subset consisting of the three neighbouring stereoscopic cameras based on a distance between each such neighbouring stereoscopic camera of the subset and the point of intersection, and combining the respective distorted images for each of the three neighbouring stereoscopic cameras of the subset in accordance with the determined weightings.

8. A display system comprising:
  a display element operable to display an image of an object to a viewer;
  a pose detector operable to detect a pose of the viewer's head;
  an image processor operable to obtain a plurality of source images of the object and camera pose data indicating a pose of a camera that captured each source image;
  wherein the image processor is configured to receive an input from the pose detector, and in response thereto, distort at least some of the source images based on a difference between the pose of the camera or cameras associated with the source images and a current pose of the viewer's head relative to a reconstruction of the object; and
  an image combiner configured to determine a weighting associated with some of the distorted images based on a similarity between the pose of the camera associated with that distorted image and the pose of the viewer's head relative to the reconstruction; wherein:
  the image combiner is configured to combine the distorted images together in accordance with the associated weightings to form an image of the object for display at the display element,
  each source image comprises a stereoscopic image captured by a respective stereoscopic camera among an array of stereoscopic cameras arranged vertically and or horizontally in an x-formation to define a plane relative to the subject,
  at least five source images are obtained, the poses associated with the at least five source images corresponding to the array of stereoscopic cameras, and
  determining a weighting associated with the some of the distorted images comprises, which are generated from among the at least five source images:
  (i) determining a point of intersection between a line joining the virtual camera to the subject and a triangle defined in the plane by a subset consisting of three neighbouring stereoscopic cameras of the array of stereoscopic cameras; and (ii) determining a weighting associated with each distorted image, among the respective distorted images, taken from the subset consisting of the three neighbouring stereoscopic cameras based on a distance between each such neighbouring stereoscopic camera of the subset and the point of intersection, and combining the respective distorted images for each of the three neighbouring stereoscopic cameras of the subset in accordance with the determined weightings.

9. A display system according to claim 8, wherein the image processor is further configured to obtain depth data associated with each source image, and to generate, for each source image, a polygonal mesh of the subject based on the source image and depth data associated with that image; and wherein the image processor is configured to generate a distorted image from each source image by reprojecting at least some portions of the mesh generated for that source image so as to be perpendicular to the direction in which the viewer's head is facing.

10. A display system according to claim 9, wherein the image processor is configured to generate, for each re-projected mesh, texture for applying to that mesh; and wherein the image processor comprises a parallax shader operable to parallax map portions of the source image to portions of the corresponding re-projected mesh.

11. A display system according to claim 8, wherein the pose of the viewer's head corresponds to the pose of a virtual camera for viewing the object and the poses of the camera or cameras that captured the source images corresponds to a camera array plane; and wherein the image combiner is configured to determine a point of intersection between a vector joining the virtual camera to the object and the camera array plane; and wherein the image combiner is configured to determine a weighting for each distorted image based on the poses of the camera or cameras that captured the source images and the point of intersection on the camera array plane.

12. A display system according to claim 8, comprising a head-mountable display;

wherein the display element corresponds to the display element of the head-mountable display and wherein the pose detector is operable to detect a position and or orientation of the head-mountable display.

13. A display system according to claim 12, comprising a games console that is in communication with the head-mountable display, and wherein the games console comprises the image processor and is operable to transmit the combined distorted images to the head-mountable display for display at the display element.

* * * * *